UNITED STATES PATENT OFFICE.

CHESTER B. DURYEA, OF NEW YORK, N. Y.

PROCESS OF PRODUCING MALTOSE.

1,110,756.  Specification of Letters Patent.  Patented Sept. 15, 1914.

No Drawing.  Application filed March 27, 1913.  Serial No. 757,272.

*To all whom it may concern:*

Be it known that I, CHESTER B. DURYEA, a citizen of the United States, and resident of the borough of Brooklyn, in the city and State of New York, have invented a new and useful Process of Producing Maltose, of which the following is a specification.

My invention relates to industrial maltose products, syrups and solids. It supplies an answer to problems which have long interposed between the indubitable advantages of natural starch derivatives and their broad commercial realization.

In starch paste "saccharifications", maltose processes employ a specific hydrolytic principle which is physiological. Upon the other hand, glucose manufacture is an application of a general condition of acid hydrolysis, as lacking in self limits as in specificity. The competition between these two type methods of converting starch or starchy material into commodities (syrups and solids) that are more or less sweet, is of long standing. The acid process was the first in the field (about 1811), except as regards Japan. Maltose products, in that empire, have been manufactured and highly esteemed from a very remote period. Owing to the non-specificity of the conversion principle (acid-hydrolysis) employed in glucose manufacture, it was comparatively easy to develop the resulting type of products so that they were cheap. Absence of specificity and self-limiting qualities in the mode of glucose manufacture, however, results in the development of secondary and even more profoundly decomposing actions during the course of the transformations of the starch paste and its associated impurities. Thus it is that despite the application of elaborate refining methods, following easy first steps, advanced decomposition products remain in finished glucose commodities to a detrimental extent. These drawbacks, after a century's continued experience, have not been mastered and from their very nature are not likely ever to be. Such characteristic disadvantages, inseparable from acid converted glucose as commercially manufactured, particularly from maize starch, are over and above numerous other objections that attach to this type of starch conversion product.

In contrast with the circumstances outlined, the selective and self-limiting action of the natural saccharifying principle utilized in maltose manufacture stands out convincingly as inherently superior, aside from the advantages associated with the use of the special physiological type of the resulting products. In complementary relation with this specificity, in practice very particular and controlled manufacturing conditions are necessary for complete commercial success.

After maltose manufacture had become established in Europe as an important industry, but before experience in the ordinary channels could provide the requisite knowledge, glucose became so cheap that broad commercial support for maltose products was impracticable and retrogression set in.

The object of my present invention is to provide for the revival of industrial maltose manufacture, on a basis of competitive cost with glucose.

There are a number of principles, or ways and means, comprised within or associated with my invention. The nature of these will be indicated in what follows, before proceeding with a description of a practicable way of carrying out my process. This explanation applies particularly to manufacture in which maize starch is utilized, although I do not limit myself to maize starch.

I have discovered that the use of starch more or less modified, or artificially thinner boiling than ordinary starch, is an effective means for reducing the cost and improving the quality of commercial maltose.

I have discovered that cooking modified starch paste at a relatively high concentration, before diastatic saccharification, is an effective means for reducing the cost and improving the quality of commercial maltose.

I have discovered that very slight acidity of modified starch paste during cooking, followed by neutralization before saccharification, is an effective means for reducing the cost and improving the quality of commercial maltose.

I have discovered that the use of starch that has been modified and purified by means of heating under mildly acidic conditions, followed by re-running or other cleansing treatment, is an effective means for reducing the cost and improving the quality of commercial maltose.

I have discovered that purifying modified starch, after modification and before cooking, is an effective means for reducing the cost and improving the quality of commercial maltose.

I have discovered that limited acid hydrolysis by the "in-suspension" method is an effective way of treating starch, so as to reduce the cost and improve the quality of commercial maltose.

I have discovered that purifying modified crude green starch, modified both as to starch and impurities by the "in suspension" method, after the modifying treatment and before cooking, is an effective means for reducing the cost and improving the quality of commercial maltose.

I have discovered that the use of very small proportions of malt or its equivalent may be made practicable and that this, through causes and effects in part not understood before, is an effective means for reducing the cost and improving the quality of commercial maltose.

I have discovered that for some special products, or for a fractional part of the output of a given works, separating the active enzymic matter from general malt extractives before introduction into cooked and neutralized amylaceous pastes, is an effective means for improving the quality of commercial maltose, and, in some particulars, reducing the cost.

I have discovered that high concentration cooking of modified starch pastes, provides conditions which appear to be remarkably efficient in nullifying the usual inhibitory effects on diastatic activity of such common factory contaminants as Cu salts, etc., and that this condition is an effective means of reducing the cost and improving the quality of commercial maltose.

I have discovered that at least relatively viscous modified starch pastes while faintly but definitely acid (the water present existing mainly in more or less firmly fixed constitutional hydration integral with the paste) may be subjected to controlled cooking so as (1) to enormously reduce the most difficult subsequent work required of the malt or its equivalent (completing liquification and solution); and (2) to perfect the carbohydrate yield; (3) without destroying the diastatic type of the finished products; (4) without seriously affecting impurities; (5) without developing inhibiting conditions; and how to apply these discoveries so that they become effective means for reducing the cost and improving the quality of commercial maltose.

I have discovered that adjusted neutralization in relation to the finished products, considered as homogeneous entities, is seemingly the more effective the earlier in the process it is done—that is, neutralization is most effective when finally adjusted at the stage of completion of new carbohydrate compounds and before concentration is advanced (progressive removal of water less and less " free ")—and that this may be an effective means for improving the quality of commercial maltose.

I have discovered other conditions and how to advantageously combine and regulate these and the associated principles and conditions in their practical application so as to radically reduce the cost and at the same time perfect the purity of industrial maltose products, and this reduction to practice constitutes my present invention as a whole.

In describing the process of my present invention with reference to corn (maize) starch, the following divisions are convenient: crude green starch, modification, purification, cooking, cooling and neutralization, saccharification, and refining and concentration.

*Crude green starch.*—Corn may be cleaned, steeped, degerminated, ground, seived, and crude green starch deposited upon the runs or tables as usual. Handling of customary by-products need not be disturbed. The crude green starch phase of manufacture may be carried out in a dissociated plant. Indeed, ordinarily mill starch of commerce may be used. I prefer, however, fresh crude green starch produced through the aid of well known dilute sulfurous acid steeping.

*Modification.*—Modification in the broad sense intended herein with respect to crude green starch, relates to changes in impurities as well as in the starch granules themselves. Modification may be conducted by means of treating the crude green starch in aqueous suspension at an elevated temperature (say at 20° Baumé, and from 53° to 55° C.) with only a faint acidity present. Under such conditions, however, the modification of the impurities in relation to the starch as a whole (especially the nitrogenous ones) may be relatively greater than of the starch granules, particularly as a final result following purification by means of dilution and re-running. The principles of starch modification and purification discovered and applied by me with respect to the working of my present invention, whereby starch granules, usually carrying impurities, are pasted and the paste in turn modified or advanced toward saccharification to a specific extent by means of controlled mildly acid cooking before diastatic action is begun, have a number of aspects in addition to those already mentioned, and some of them may now be indicated with advantage.

I. Owing to the general hydrolytic influence of acidic cooking, it is advantageous to purify crude green starch before cooking and further to employ acidic conditions as specific means for this early purification, so that, in addition to securing a general purification of the carbohydrate material in advance of acidic pasting and cooking, the impurities remaining shall be relatively less susceptible to hydrolysis than before, and in general in one form or another to get rid of as much of the more easily hydrolyzable combined amino-nitrogen as may be before carbohydrates and proteins become involved together in pasting and solution conditions. Moreover, the nitrogenous bodies unavoidably existing in true or pseudo-solution, at the end of cooking and saccharification, are as a whole more readily precipitated or adsorbed in the course of refining, or are otherwise less objectionable.

II. In order to enable high initial concentrations to be worked, considerable thin-boiling modification of the starch granules is necessary, and this, especially when brought about by acid hydrolysis, is of great advantage with respect to the ultimate purity of the products and simple and economical refining.

III. In addition to providing for high initial cooking concentrations, suitable thin-boiling modification of the starch enables the acidity requisite for securing a correct carbohydrate cooking condition to be reduced, and so diminishes the relative hydrolytic effect on the impurities present.

IV. Acidic purification of the starch before pasting, favorably influences additional reduction in cooking acidity in addition to the other advantages.

I prefer, at present, to carry out modification according to the method of my United States Patent No. 696,949, granted April 8, 1902. Special attention should be given to avoiding swollen starch granules, particularly when dilution and re-running are to be the modes of purification.

For crude green maize starch produced by the sulfurous acid process, I have found 0.5 per cent $H_2SO_4$ on the menstruum and a temperature not over 55° C. applied continuously for six hours, to be entirely practicable in connection with subsequent re-running.

The extent to which modification should be carried and its best mode of application will depend upon how far in any given case the advantages of my invention are required, or to what extent they may be carried, because of limitations in type, capacity, arrangement, etc., of a given equipment, fixed condition of manufacturing supplies, and considerations of like character.

For crude green maize starch, for instance, I prefer at present a degree of modification about corresponding to in-suspension treatment with a menstruum acidity of 0.5 per cent $H_2SO_4$, or about 0.2 per cent HCl, for about six hours at 55° C., and to operate at a gravity of about 20° Baumé.

*Purification.*—The end of modification treatment being reached, the modified crude green starch liquor may be diluted with water (cool or cold) to about 5° Baumé, and re-run. The dilution is best provided for by an arrangement of modification "treaters" above diluting tanks; these tanks or cisterns, of course, being supplied with suitable agitators, intakes, outtakes, water supply, etc. Modification treatment being completed, the charge or charges are rapidly dropped into water undergoing agitation in the diluters below, and secondary tabling or re-running carried out. It may be remarked here, that the rate of passage of the diluted modified crude green starch liquor over the runs or tables need not be so great as in primary running, and that to offset such a decrease in rate the gravity for re-running may be increased. Washing by decantation, filter-pressing, etc., may be practiced, but I prefer re-running.

*Cooking.*—Cookers of usual and approved form, with internal agitators, may be used. Indeed, my process might be carried on with the use of non-stirring cookers. But I prefer, at present, a horizontal form of cooker, supplied with internal mechanical agitators, and constructed with a built-on steam jacket. The latter is a provision for the avoidance of the dilution and, to an extent, the contamination of the charges to be cooked, that would occur if live steam were introduced therein for the purpose of raising the temperature to boiling. Charges of suitably purified modified starch, suspended in water at a gravity of about 16° Baumé, may be introduced into a cooker of the form indicated as preferred, and acidified, or the acidity adjusted by the use of a suitable alkali. Acidification may, of course, be effected either before or after the introduction of the charge. Under fixed conditions of time and temperature the acidity requisite for cooking needs to be established by trial in each particular case, after which cooking routine is readily subject to competent control. Not only does the extent of previous starch granule modification and the concentration influence this feature, but the extent and character of organic and inorganic purification (de-mineralization) also bear upon the effectiveness of the apparent free acidity outstanding in the menstruum before, pasting is begun, and upon other phases of the process. I prefer an acidification with HCl, *i. e.*, muriatic acid of good grade diluted with at least an equal amount of water, but other acids may be used, such as $H_2SO_4$.

The acidity should be adjusted before pasting and may best be determined on a filtrate from the starch suspension. Using methyl orange as the indicator and titrating to the end of color change, an acidity corresponding roughly to 0.015 per cent. of apparent HCl may be taken as a guide when employing thirty pounds steam pressure and thirty minutes, after pressure is reached, for the standard cooking time. This apparent acidity on the menstruum of a 16° Baumé suspension would correspond roughly to about 0.01 per cent. apparent HCl as determined on the charge as a whole, after cooking and blowing out. The agitators should be in operation when the charge is introduced, and such agitation should be maintained at least until the charge becomes pasted and practically homogeneous, chemically and physically (including temperature), at the maximum heat of cooking. When the charge is ready for cooking as above directed heat is applied by means of the steam jacket and heating is continued until boiling begins at about atmospheric pressure and until the steam developed has displaced the air dissolved in the charge and contained in the space above it in the cooker. The cocks or other cooker openings left unclosed for this purpose are then shut and steam is cut off in the jacket and turned into the charge, through inlets well known as suitable for use in horizontal converter cooking of farinaceous materials. The tendency of the starch to settle or to be caught in depressions, before it is pasted, should, of course, be borne in mind.

As already indicated, I prefer at present to choose and practice a degree of preparatory starch modification and purification which will permit an initial gravity of about 16° Baumé, and an apparent HCl menstruum cooking acidity of roughly about 0.015 of one per cent. so as to develop the desired carbohydrate modification of the modified starch paste in about thirty minutes at about thirty pounds steam pressure. The cooked blow-out charges may have a density of about 17½° Baumé.

The principal object of acidic cooking is to derive a special, or specific, carbohydrate condition. This condition is substantially a maximum limit beyond which I have discovered that acidic cooking cannot be practiced without risk of adversely affecting the diastatic type of final maltose products, at least when maize starch is employed as the manufacturing base. The nearer this limit is approached, everything else being equal, the less the relative amount of malt or its equivalent required for diastatic digestion or saccharification, while, at the same time, simplicity and economy of refining and the ultimate purity of the product is facilitated. Moreover, as will appear later, a reduction in the relative quantity of malt or its equivalent has a great indirect advantage in reducing the proportional quantity of what might be termed secondary maltose products which result from the at present preferred separate treatment of the malt extract residue for the saccharification, etc., of the starch which it would still contain.

After some little experience, the qualified operator may readily recognize and control the special carbohydrate condition of the cooked modified starch paste referred to as corresponding to data to follow. This condition as a guide, may be conveniently defined in relation to what I, at present, have detailed as the most suitable conditions to employ for the best general results.

To recapitulate, initial cooking concentration and apparent menstruum acidity should be respectively about 16° Baumé and roughly about 0.015 of one per cent. HCl, in conjunction with suitable well purified acid hydrolyzed modified crude green starch (refined modified starch). Cooking should be conducted as outlined in a steam jacketed apparatus provided with internal agitators, and steam pressure raised to 30 lbs. in standard time and rate, and maintained at that point for about 30 minutes. When treatment has been carried to the proper point or a little before, to allow for continuance of action during withdrawal, the charge is blown out into suitable apparatus in a usual manner. The receiving apparatus will be dealt with later. While adjusting the factors of menstruum acidity, the best degree of modification, purification, cooking concentration, pressure, time, etc., in a given case, intermediate "try" samples may, of course be taken or blown out from the cooker as is usual. Upon blowing out, a cooled sample of a well cooked charge will show a characteristic color reaction with the usual iodin reagent applied just short of excess. This reagent develops an extremely heavy and intense effect which may be described as closely resembling iodin vapor in color. The intensity is so great that dilution with water in the proportion of about as 1 is to 32 or 40 is necessary to enable barely seeing through a thickness of from 3 to 4 cm. against ordinary diffused window-light. The color, however, under normal conditions of cooking, should be primarily regarded as the constant of indication. The required carbohydrate condition and its corresponding iodin reaction may be established and controlled analytically. Samples of blown out charges may be at once subjected to neutralization and filtration.

A considerable portion of a sample will remain on the filter, but the filtrate will show characteristic constants connotating the carbohydrates of the cooked charge as a whole. The filtrate may be conveniently diluted to about 12° Brix and, if necessary, treated with a little aluminum hydroxid cream for clarification, bearing in mind the fact that such use of a clarifying agent tends to abstract a small portion of the more complex dextrins. Brief boiling (1 minute) may be practised as a matter of ordinary routine to insure absence of mutarotation, and filtration repeated. The solution is cooled, adjusted to about 10° Brix and, conveniently, the $$\frac{15.5}{15.5}$$

sp. gr. accurately determined. An ash determination is made on a portion of the same solution, and the apparent organic solids per 100 "reputed" cc., calculated by means of the 386 factor, according to well known methods. (Under established factory conditions it is not necessary to often repeat the ash determination). The apparent specific rotation and cupric-reducing power of the organic solids may then be determined. An $[\alpha]D_{386}$ of about 182° and a $x_{386}$ of about 0.10 (Munson and Walker's reduction method), will be found to be about correct for filtration indications. If corresponding constants could be determined with any approach to precision on the unfiltered blown-out charges, the optical values would be greater and the cupric-reducing values less than in the case of the filtrates. Moreover, on the charge as a whole, the ratio between cupric-reducing power and apparent specific rotation would be greater specifically than found for a filtrate, i. e., the value for x would be relatively and further specifically relatively reduced in proportion to the optical rotation. The phenylhydrazine acetate test applied to a filtrate should show no glucosazone, and on cooling only a very moderate separation of maltosazone. Another indication useful as a guide is that when cooking has not been carried as far as I at present prefer, the iodin reaction of the charge or filtrates already showing hues extending too far toward the blue limit, on standing tend to incline even more toward a preponderance of a sapphire blue tint.

The initial consistency of the blow-out charge, surface effects, thickening on standing, or reversion tendency - rate and limits, and other indications will with experience become additional criteria by which to measure cooking standards.

When cooking has been conducted as I at present prefer, the entire substance of the original starch granules becomes so favorably altered physically and chemically that even after allowing neutralized unfiltered samples of blown-out charges to stand in the cold until reversion equilibrium is established, reheating to ordinary boiling temperature and suitable cooling, or even direct heating to about 58° C., will enable diastatic action to readily cope with the most resistent carbohydrate present.

In order to avoid Cu and other metallic contamination as far as may be, the cookers, etc., should be constructed so that the surfaces connected with the charges shall be as little acted upon as possible. Well known ways and means of securing this result are available.

Without further repetition, special precautions of this character will be understood as applying to operations dealing with the advance of material in process up to the end of saccharification, and also to the handling of the malt and malt extract or their equivalents.

When the proper stage of cooking is reached, the charge is blown out from the converter, into the "saccharification" apparatus. This may be done directly, or through a cooling apparatus designed and adjusted so as to automatically reduce the charge substantially to the temperature of saccharification while the charge or charges are reaching the saccharification apparatus, at the same time conserving the heat that had been developed for cooking purposes. Apparatus of this type is well known.

*Cooling and neutralization.*—Upon completion of cooking, the blow-out charges may be "cooled" during passage to the "saccharifier" as already indicated, or cooling may be effected by means of suitable coils or jackets after reaching that apparatus. In fact, the saccharifier, or an intermediate apparatus, or even the cooker itself, might be used for cooling in another manner, such, for instance, as evaporating down to the required temperature under sub-atmospheric pressure. The saccharifying apparatus, which should be equipped for stirring and be supplied with coils or jacket for temperature regulation, heating, etc., may have a capacity sufficient for one or more blow-out charges. Neutralization, according to my present choice, is best begun as early as possible after blowing out from the cooker, so as to establish the correct condition for diastatic action, by the time temperatures best adapted for saccharification are reached. A solution of soda-ash is my preference for the purpose, and it should be added during effective agitation of the moderately fluid amylaceous paste. Other alkali, such as a weak solution of caustic soda, may, of course, be employed. The proper point is secured upon reaching a uniform condition of apparent neutrality to lacmoid paper.

When malt extract or its enzymic equivalent is employed for saccharification, according to my preferred practice, cooling may be continued to about 61° C., as a provision for the addition of the saccharifying agent. Everything considered, my present preference, when operating with small percentages of malt or its equivalent, is to conduct the early stages of saccharification at about 58° C.

*Saccharification.*—In case of a maltose plant of considerable output capacity, preparation of the malt is best conducted upon the premises. Green barley malt is the material at present chosen as the source of the saccharifying agent, or agents. "Long" malt of the distillery type, grown from selected barley so as to develop great diastatic power, along with restrained formation of soluble nitrogenous extractives, so far as practicable, is preferred. Beyond a certain point, however, the development of diastatic power in growing long malt should be carefully balanced, economically, against considerations relating to the inevitable dissipation of the barley substance. Well known malting methods may be practised.

I prefer, at present, that sufficient barley be dealt with, so as to provide for saccharification a minimum quantity of green malt equivalent to about 2½% to 3% of malt, on a calculated anhydrous basis, to about 100 lbs. of the finished maltose product, as syrup, referred to a gravity of about 42° Baumé. Green malt of the type and character indicated may be ground, comminuted, or bruised in suitable mills or rolls of well known type, and treated with water at, for instance, 55° C. for three hours, during which period at least intermittent agitation should be applied. I have found such a maceration to respond well to filter-pressing, and the effluent to be very active enzymically.

As indicated, I prefer to secure the malt extract by means of filter pressing, but other means, such as decantation, may be practised, and an arrangement of a battery of "continuous" extractors might be successfully used.

As already stated, my present custom is not to add the malt directly to the cooked neutralized and cooled amylaceous paste, although this may be done. Among other considerations, I now believe that a balance of advantages lies in treating the malt residue by itself in order to saccharify its residual starch content, through direct utilization of the enzymic activity which it still retains; a process that may be conducted by well known mashing methods, and which requires higher average temperatures than advantageous for the saccharification of the primary run, etc.

A useful proportional basis of bruised green malt to water for malt extract preparation may be taken as 100 pounds of malt to 42 gallons of water. To a limited extent at least, *i. e.*, for a fractional part of a given maltose output, I consider it to be advantageous to in a measure separate the active amylolytic enzymic matter from the general malt extractives, especially from the nitrogenous ones of very soluble character, and the coloring matters, etc., before commencing saccharification. Certain ways and means for accomplishing this result are well known to the literature, such as, for instance, methods that take advantage of the special tendency of enzymes to become adsorbed by, attached to, or carried down by physical or chemical, coagulants and precipitants. To avoid unnecessary reversion effects, cooling and neutralization of the blow-out charges should be proceeded with expeditiously. An open or closed saccharifier may be used. Each type has advantages, but, on the whole, my preference, at present, inclines toward the closed type.

As soon as the lot or batch is ready for saccharification, incorporation of the malt extract or its equivalent is proceeded with. The minimum proportion of malt that I have so far found to be generally advantageous for saccharification treatment corresponds to a proportion of malt extract, secured as indicated, equivalent to a quantity of green malt calculated on a water free basis as corresponding to about two and one-half to three pounds of dry malt to one hundred pounds of the finished syrup of a gravity of 42° Baumé.

The malt extract or priming solution is added to the lot or batch in the saccharifier while stirring is maintained, and the temperature should be such before priming, in relation to the priming extract, made and used in the quantity recommended, that the initial temperature of the mixture will be not over about 58° C.

Saccharification temperature may be maintained at about 58° C., by means of the coils or the jacket already referred to, and at least occasional stirring is practised. When operating as detailed herein as being in accord with the practice which I at present prefer (including the use of active malt extract in minimum quantity corresponding to the given two and one-half per cent. to three per cent. reference basis), cooled samples of a lot or batch should show a cessation of the iodin reaction within less than about thirty minutes. For production of a generally useful type of products saccharification treatment may be continued until an $[\alpha]D_{386}$ on the carbohydrate solids of a filtrate equal to about 156° to 153° or even lower is reached. When employing minimum quantities of malt or its equivalent, about three-fourths to two hours from the time of priming may be taken as a general guide for the length of saccharification treatment. One hour or even less is sufficient with highly active malt.

If, owing to inadvertence or accident in cooking, a lot or batch should show a bluish iodin color reaction indicating the presence of some small proportion of amylaceous dextrins more complex than indicated as being normal, raising the temperature at a moderate rate to about 70° C., will generally complete amylolysis. At or somewhat before the time of disappearance of the iodin reaction, when operations have been conducted as directed, say about 15 or 30 minutes from priming time, a characteristic flocculation of suspended impurities (nitrogenous matter, etc.,) occurs in the batch, if at rest. In general, good flocculation indicates good filtration.

Raising the temperature at a moderate rate to 70° to 74° C., as a completion to the saccharification step, seems to have a generally beneficial effect, especially as regards subsequent filtration, and this procedure is recommended as part of regular practice. It is optional, of course, to vary the practice in a number of ways, as will readily occur to a practised operator. For instance, a larger malt equivalent may be used with, or without, a reduction in saccharification time. The initial, mean and finishing temperatures may be varied, etc., and saccharification conditions and limits made to cover a wide range of products. Cooking variations may also be introduced and controlled so as to modify the character of the products, and to shorten or to lengthen the time of disappearance of the iodin reaction and the total period of saccharification. Considerable variation from standard cooking effect is not advised and should be approached with caution.

The particularity of my present description deals with the mode of practice I now prefer.

*Refining and concentration.*—Amylolysis being completed as described or indicated, the saccharified lot or batch may be heated and briefly boiled in the saccharifier, or in other suitable apparatus, and then subjected to filtration. Filter presses may be used for this first filtration, but I now prefer the well known method of bag filtration as being more efficient for the purpose.

Refining and concentration of the resulting light liquor may be proceeded with in any convenient and well known way. For the best general results, I at present prefer to refine and concentrate in a manner entirely similar to the methods of practice well known as part of glucose manufacture.

The ratio basis of char to finished product, suitable in refining maltose liquors yielded by my present process, is an enormous reduction in comparison with the proportion necessary in glucose practice. In fact, simple concentration *in vacuo*, without refining my light liquors at all, will yield products of an attractive color and flavor, lacking clarification only to render them entirely merchandizable. In the case of glucose, however, this is not the case and exceptionally costly and elaborate refining, contributing its own contamination to the products, cannot be omitted for even that portion of the output intended for the least particular grade of trade.

I have found the controlled use of coagulants, in the refining of my products, to be exceptionally useful, either with or without bone char treatment. When used in conjunction with char treatment, a guide as to the use of a particular coagulant, *i. e.*, tannic acid, and also as to a minimum proportion of char, is given in my United States Patent No. 916683, granted March 30, 1909. A variation from the procedure detailed therein may be to treat the maltose light liquors after say first Taylor bag filtration with tannic acid, and then, before again filtering, treating the mass with the so-called spent char resulting from revivification and general char handling. This should be done in such a manner as to remove any excess of coagulant from solution. A second filtration (bag filters or presses) may then be practised, and concentration and further refining (if desired) proceeded with. If desired, a coagulant and spent-char may even be added to the saccharified charges before first filtration.

The great point to emphasize with respect to refining is that maltose liquors yielded by my process do not require refining in the acid-process glucose sense, but only clarification.

In cases where a faintly perceptible but characteristic malty flavor is best eliminated and an exceptionally light color is desired, as in products intended for certain hard candy manufacture, char refining is indicated and may be practised to the requisite extent. This instance also calls for close adjustment of neutrality and reduction to a minimum of acidic constituents—such as certain phosphates.

As a conservative estimate, with regard to the refining element of manufacturing expense, this cost in the case of my maltose products does not in the aggregate exceed more than about one-fourth of that requisite in the case of commercial glucose. And, as the total manufacturing cost of glucose is to the cost of its refining about as two is to one, and further, as modern (maize starch) glucose calls for special treatment of the crude green starch and subsequent re-running, it is apparent (aside from the relative merits or demerits of the products) that industrial maltose is now practicable on a cost basis certainly not in excess of that of glucose. In this connection, it should be borne in mind, that according to my process, wherein relatively small quantities of malt are used, the market will readily take the very minor proportion of "secondary" products yielded by the malt residue, and that the proceeds from this, and the final malt presscake or feed, and the carbohydrates contributed to the main run, will pay for the barley, malting, and preparation of the extract, as a factor over and above the cost of glucose converter-acid and neutralizing agent.

As a further guide with respect to refining, especially as to products intended for confectioners' use, it may be again stated that the final adjustment of neutralization seems to be most advantageous the earlier in the process it is done. No sulfites, dopes or dyes of any kind are necessary or desirable. The products are exceptionally free from objectionable ammonia, amino, and pentose compounds, and generally from abnormal decomposition and reversion substances. Emphasis may be laid upon the fact that the special carbohydrate type of my present products has been found to be inherently superior to glucose in the peculiar technical and merchandising qualities so long desired in certain hard candy manufacture.

Cooking treatment of the modified starch paste may, of course, be carried further than I have designated as typical of my invention, but, although leading to a much shortened digestion period for a given proportion of malt, I discountenance it in a general way as producing a divergence from diastatic type. On the other hand, the amylaceous paste may not be advanced in cooking as far as I have specified as considered most desirable for best general results. Concentration for concentration, however, and everything else being equal, more malt is likely to be required (even if saccharification time were extended or the temperature raised) and the quality of the products is apt to be less desirable.

My principle of avoiding unnecessary addition or development of soluble impurities to or in the cooked amylaceous paste should be remembered. Sub-normal cooking moreover is more than likely to subject yield, filtration, evaporation, etc., to adverse effects.

The starch may not be brought under pasting conditions in the normal way specified as being my choice, and cooking might be initiated and carried on in a way similar to that practised in introducing starch into the converters in glucose practice, etc., and cooking completed in a converter of that type. Cooking densities may be varied. Objections to unnecessary depression of this condition are apparent. Increase of concentration, for the specific iodin reaction given, tends to be disadvantageous through stultification of diastatic activity; under given conditions a relatively moderate increase in concentration, will be likely to increase the physical-chemical tension between the carbohydrates and water, so that there no longer remains of the latter enough that is sufficiently "free" for adequate enzymic hydrolysis. I have practiced such overlimits, and numerous unsatisfactory variations, and additional changes may suggest themselves, but I now prefer that my new process be operated according to my present specifications and so that the finished products shall yield negative results for dextrose (d-glucose), when examined by the well known phenyl-hydrazine acetate test.

In using the word "modified" I intend to cover crude green starch that has been even slightly reduced in viscosity by subjection to an elevated temperature while held in aqueous suspension without the addition of extraneous acid; and it is to be further understood that I do not in general intend to limit my invention to the details hereinbefore set forth except as they may be expressed in the claims, as many variations may be practiced without departing from the spirit and scope of my invention.

What I claim is:—

1. A process of making maltose comprising providing thick boiling starch, modifying said starch, purifying the modified starch, cooking the purified modified starch paste under acidic conditions, neutralizing the cooked purified modified starch paste, saccharifying the neutralized cooked purified modified starch paste by enzymic action, and finally refining and concentrating the product.

2. A process of making maltose comprising providing thick boiling starch, modifying said starch and its associated impurities, purifying the modified starch, cooking the purified modified starch paste under acidic conditions, neutralizing the cooked purified modified starch paste, saccharifying the neutralized cooked purified modified starch paste by enzymic action, and finally refining and concentrating the product.

3. A process of making maltose comprising providing thick boiling starch, modifying said starch, re-running the modified starch, cooking the purified modified starch paste under acidic conditions, neutralizing the cooked purified modified starch paste, saccharifying the neutralized cooked purified modified starch paste by enzymic action, and finally refining and concentrating the product.

4. A process of making maltose comprising providing thick boiling starch, modifying said starch by the "in suspension" process, re-running the modified starch, cooking the purified modified starch paste under acidic conditions, neutralizing the cooked purified modified starch paste, saccharifying the neutralized cooked purified modified starch paste by enzymic action, and finally refining and concentrating the product.

5. A process of making maltose comprising providing thick boiling starch, modifying said starch, purifying the modified starch, cooking the purified modified starch paste at a concentration of about 14°–18° Bé. and under acidic conditions and neutralizing the cooked purified modified starch paste, saccharifying the neutralized cooked purified modified starch paste by enzymic action, and finally refining and concentrating the product.

6. A process of making maltose comprising providing thick boiling starch, modifying said starch and its associated impurities, purifying the modified starch, cooking the purified modified starch paste at a concentration of about 14°–18° Bé. and under acidic conditions, neutralizing the cooked purified modified starch paste, saccharifying the neutralized cooked purified modified starch paste by enzymic action, and finally refining and concentrating the product.

7. A process of making maltose comprising providing thick boiling starch, modifying said starch and its associated impurities, re-running the modified starch and impurities, cooking the purified modified starch at a concentration of about 14°–18° Bé. and under acidic conditions, neutralizing the cooked purified modified starch paste, saccharifying the neutralized cooked purified modified starch paste by enzymic action, and finally refining and concentrating the product.

8. A process of making maltose comprising providing thick boiling starch, modifying said starch, purifying the modified starch, cooking the purified modified starch paste at a concentration of about 14°–18° Bé. and under very slight acidic conditions, neutralizing the cooked purified modified starch paste, saccharifying the neutralized cooked purified modified starch paste by enzymic action, and finally refining and concentration the product.

9. A process of making maltose comprising providing thick boiling starch, modifying said starch and its associated impurities by the "in suspension" process at a gravity of about 20° Baumé, a temperature of about 55° C., acidity equivalent to about 0.5 per cent. sulfuric acid, for a period of about six hours, purifying the modified starch, cooking the purified modified starch paste under acidic conditions, neutralizing the cooked purified modified starch paste, saccharifying the neutralized cooked purified modified starch paste by enzymic action, and finally refining and concentrating the product.

10. A process of making maltose comprising providing thick boiling starch, modifying said starch and its associated impurities by the "in suspension" process at a gravity of about 20° Baumé, a temperature of about 55° C., acidity equivalent to about 0.5 per cent. sulfuric acid, for a period of about six hours, re-running the modified starch and impurities, cooking the purified modified starch paste under acidic conditions, neutralizing the cooked purified modified starch paste, saccharifying the neutralized cooked purified modified starch paste by enzymic action, and finally refining and concentrating the product.

11. A process of making maltose comprising providing thick boiling starch, modifying said starch and its associated impurities by the "in suspension" process at a gravity of about 20° Baumé, a temperature of about 55° C., acidity equivalent to about 0.5 per cent. sulfuric acid, for a period of about six hours, purifying the modified starch, cooking the purified modified starch paste under very slight acidic conditions, neutralizing the cooked purified modified starch paste, saccharifying the neutralized cooked purified modified starch paste by enzymic action, and finally refining and concentrating the product.

12. A process of making maltose comprising providing thick boiling starch, modifying said starch and its associated impurities by the "in suspension" process at a gravity of about 20° Baumé, a temperature of about 55° C., acidity equivalent to about 0.5 per cent. sulfuric acid, for a period of about six hours, re-running the modified starch and impurities, cooking the purified modified starch paste under very slight acidic conditions, neutralizing the cooked purified modified starch paste, saccharifying the neutralized cooked purified modified starch paste by enzymic action, and finally refining and concentrating the product.

13. A process of making maltose comprising providing thick boiling starch, modifying said starch, purifying the modified starch, cooking the purified modified starch paste under conditions equivalent to about 16° Bé., 30 pounds steam pressure, 0.015 apparent HCl, for about thirty minutes neutralizing the cooked purified modified starch paste, saccharifying the neutralized cooked purified modified starch paste by enzymic action and finally refining and concentrating the product.

14. A process of making maltose comprising providing thick boiling starch, modifying said starch, cooking the modified starch paste under conditions equivalent to about 16° Bé., 30 pounds steam pressure 0.015 apparent H.Cl, for about thirty minutes neutralizing the cooked modified starch paste, saccharifying the neutralized cooked modified starch paste by enzymic action and finally refining and concentrating the product.

15. A process of making maltose comprising providing thick boiling starch, modifying said starch, cooking the modified starch paste under conditions equivalent to about 16° Bé., 30 pounds steam pressure, 0.015 apparent HCl for about thirty minutes neutralizing the cooked modified starch paste, saccharifying the neutralized cooked modified starch paste with a very small percentage of an enzymic agent, and finally refining and concentrating the product.

16. A process of making maltose comprising providing thick boiling starch, modifying said starch, cooking the modified starch paste under conditions equivalent to about 16° Bé., 30 pounds steam pressure, 0.015 apparent HCl for about thirty minutes neutralizing the cooked modified starch paste, saccharifying the neutralized cooked modified starch paste with a very small percentage of malt extract, and finally refining and concentrating the product.

17. A process of making maltose comprising providing thick boiling starch, modifying said starch, cooking the modified starch paste under conditions equivalent to about 16° Bé., 30 pounds steam pressure, 0.015 apparent HCl, for about thirty minutes neutralizing the cooked modified starch paste, saccharifying the neutralized cooked modified starch paste with malt extract in a proportion equivalent to about two and one-half to three pounds of dry green malt to one hundred pounds of the finished product of a gravity of about 42° Baumé, and finally refining and concentrating the product.

18. A process of making maltose comprising providing thick boiling starch, modifying said starch, purifying the modified starch, cooking the purified modified starch paste under acidic conditions, neutralizing the cooked purified modified starch paste to a uniform condition of apparent neutrality to lacmoid paper, saccharifying the neutralized cooked purified modified starch paste by enzymic action, and finally refining and centrating the product.

19. A process of making maltose comprising providing thick boiling starch, modifying said starch, purifying the modified starch, cooking the purified modified starch paste under acidic conditions, cooling the cooked purified modified starch paste and neutralizing the same to a uniform condition of apparent neutrality to lacmoid paper, saccharifying the neutralized cooked purified modified starch paste by enzymic action, and finally refining and concentrating the product.

20. A process of making maltose comprising providing thick boiling starch, modifying said starch, purifying the modified starch, cooking the purified modified starch paste under acidic conditions, neutralizing the cooked purified modified starch paste, saccharifying the neutralized cooked purified modified starch paste with a very small percentage of an enzymic agent, and finally refining and concentrating the product.

21. A process of making maltose comprising providing thick boiling starch, modifying said starch, purifying the modified starch, cooking the purified modified starch paste under acidic conditions, neutralizing the cooked purified modified starch paste, saccharifying the neutralized cooked purified modified starch paste with a very small percentage of malt extract, and finally refining and concentrating the product.

22. A process of making maltose comprising providing thick boiling starch, modifying said starch, purifying the modified starch, cooking the purified modified starch paste under acidic conditions, neutralizing the cooked purified modified starch paste, saccharifying the neutralized cooked purified modified starch paste with malt extract in a proportion equivalent to about two and one-half to three pounds of dry green malt to one hundred pounds of the finished product of a gravity of about 42° Baumé, and finally refining and concentrating the product.

23. A process of making maltose comprising providing thick boiling starch, modifying said starch, cooking the modified starch paste at a gravity of about 16° Baumé, a pressure of about thirty pounds, an acidity equivalent to about 0.01 of one per cent. apparent HCl for a period of about thirty minutes, neutralizing the cooked modified starch paste, saccharifying the neutralized cooked modified starch paste with malt extract in a proportion equivalent to about two and one-half to three pounds of dry green malt to one hundred pounds of the finished product of a gravity of about 42° Baumé, and finally refining and concentrating the product.

24. A process of making maltose comprising providing thick boiling starch, modifying said starch, purifying the modified starch, cooking the purified modified starch paste at a gravity of about 16° Baumé, a pressure of about thirty pounds, an acidity equivalent to about 0.01 of one per cent. apparent HCl for a period of about thirty minutes, neutralizing the cooked purified modified starch paste, saccharifying the neutralized cooked purified modified starch paste with malt extract in a proportion equivalent to about two and one-half to three pounds of dry green malt to one hundred pounds of the finished product of a gravity of about 42° Baumé and finally refining and concentrating the product.

25. A process of making maltose comprising providing thick boiling starch, modifying said starch and its associated impurities by the "in suspension" process, rerunning the modified starch and impurities, cooking the purified modified starch paste at a gravity of about 16° Baumé, a pressure of about thirty pounds, an acidity equivalent to about 0.01 of one per cent. apparent HCl for a period of about thirty minutes, neutralizing the cooked purified modified starch paste, saccharifying the neutralized cooked purified modified starch paste with malt extract in a proportion of about two and one-half to three pounds, of dry green malt to one hundred pounds of the finished product at a gravity of about 42° Baumé, and finally refining and concentrating the product.

In testimony, that I claim the foregoing as my invention, I have signed my name in presence of two witnesses, this twenty-sixth day of March, 1913.

CHESTER B. DURYEA.

Witnesses:
F. GEORGE BARRY,
C. L. LUNDGREN.